(12) United States Patent
Ito et al.

(10) Patent No.: US 11,895,499 B2
(45) Date of Patent: Feb. 6, 2024

(54) TRANSMISSION APPARATUS, RECEPTION APPARATUS, COMMUNICATION SYSTEM, COMMUNICATION METHOD, AND DATA PROCESSING METHOD

(71) Applicant: NEC Corporation, Tokyo (JP)

(72) Inventors: Hironori Ito, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 129 days.

(21) Appl. No.: 17/275,518

(22) PCT Filed: Sep. 5, 2019

(86) PCT No.: PCT/JP2019/035020
§ 371 (c)(1),
(2) Date: Mar. 11, 2021

(87) PCT Pub. No.: WO2020/054578
PCT Pub. Date: Mar. 19, 2020

(65) Prior Publication Data
US 2022/0038901 A1 Feb. 3, 2022

(30) Foreign Application Priority Data

Sep. 14, 2018 (JP) .................. 2018-172140

(51) Int. Cl.
*H04W 12/106* (2021.01)
*H04W 12/08* (2021.01)
(52) U.S. Cl.
CPC ......... *H04W 12/106* (2021.01); *H04W 12/08* (2013.01)

(58) Field of Classification Search
CPC . H04W 12/106; H04W 12/108; H04W 12/08; H04W 12/10
See application file for complete search history.

(56) References Cited

U.S. PATENT DOCUMENTS 11,564,097 B2 * 1/2023 Ingale ................... H04L 9/3242
2017/0048241 A1 2/2017 Tanabe et al.
(Continued)

FOREIGN PATENT DOCUMENTS

| JP | 2009-081564 A | 4/2009 |
| JP | 2012-249107 A | 12/2012 |
| WO | 2015/170457 A1 | 11/2015 |

OTHER PUBLICATIONS

International Search Report for PCT Application No. PCT/JP2019/035020, dated Nov. 19, 2019.
(Continued)

*Primary Examiner* — Wayne H Cai
(74) *Attorney, Agent, or Firm* — Sughrue Mion, PLLC.

(57) ABSTRACT

An object is to provide a transmission apparatus which can suppress an increase in processing load in a communication apparatus such as a sender and a receiver due to an increase in the number of messages to be transmitted. A transmission apparatus (10) according to the present disclosure includes a generation unit (11) for generating authentication information used for confirming integrity of a plurality of data pieces using the plurality of data pieces and an integrity protection key transmitted at different timings, and a communication unit (12) for transmitting the plurality of data pieces and the authentication information to a reception apparatus (20) for confirming the integrity of the plurality of data pieces.

10 Claims, 16 Drawing Sheets

(56) References Cited

U.S. PATENT DOCUMENTS

2019/0124572 A1* 4/2019 Park ................. H04W 36/0088
2020/0413279 A1* 12/2020 Kim .................... H04W 76/27

OTHER PUBLICATIONS

3GPP TS 33.501 V15.1.0 (Jun. 2018), 3rd Generation Partnership Project, Technical Specification Group Services and System Aspects, Security architecture and procedures for 5G system (Release 15), pp. 1-152.

Nilsson, Dennis K. et al., "Efficient In-Vehicle Delayed Data Authentication Based on Compound Message Authentication Codes", 2008 IEEE 68th Vehicular Technology Conference, Sep. 21, 2008, pp. 1-5.

\* cited by examiner

| | 8 | 7 | 6 | 5 | 4 | 3 | 2 | 1 | |
|---|---|---|---|---|---|---|---|---|---|
| | UE network capability IEI | | | | | | | | octet 1 |
| | Length of UE network capability contents | | | | | | | | octet 2 |
| | EEA0 | 128-EEA1 | 128-EEA2 | 128-EEA3 | EEA4 | EEA5 | EEA6 | EEA7 | octet 3 |
| | EIA0 | 128-EIA1 | 128-EIA2 | 128-EIA3 | EIA4 | EIA5 | EIA6 | EIA7 | octet 4 |
| | UEA0 | UEA1 | UEA2 | UEA3 | UEA4 | UEA5 | UEA6 | UEA7 | octet 5* |
| | UCS2 | UIA1 | UIA2 | UIA3 | UIA4 | UIA5 | UIA6 | UIA7 | octet 6* |
| | ProSe-dd | ProSe | H.245-ASH | ACC-CSFB | LPP | LCS | 1xSR VCC | NF | octet 7* |
| | ePCO | HC-CP CIoT | ERwoPDN | S1-U data | UP CIoT | CP CIoT | Prose-relay | ProSe-dc | octet 8* |
| | 15 bearers | SGC | N1mode | DCNR | CP backoff | RestrictEC | V2X PC5 | multipleDRB | octet 9* |
| | Spare | | | | | | | | octet 10* - 15* |

Fig. 6

TRANSMISSION APPARATUS, RECEPTION APPARATUS, COMMUNICATION SYSTEM, COMMUNICATION METHOD, AND DATA PROCESSING METHOD

This application is a National Stage Entry of PCT/JP2019/035020 filed on Sep. 5, 2019, which claims priority from Japanese Patent Application 2018-172140 filed on Sep. 14, 2018, the contents of all of which are incorporated herein by reference, in their entirety.

TECHNICAL FIELD

The present disclosure relates to a transmission apparatus, a reception apparatus, a communication system, a communication method, and a data processing method.

BACKGROUND ART

At present, the 3GPP (3rd Generation Partnership Project), which establishes standards for mobile networks, is studying the specifications of 5G (5 Generation) networks. In comparison with networks such as 4G, the 5G network is expected to accommodate an enormous number of IoT (Internet Of Things) terminals.

The 3GPP is also studying security specifications for IoT terminals accommodated in the 5G networks. For example, Non Patent Literature 1 discloses the contents of a security technology applied to the 5G network.

Non Patent Literature 1 discloses that a sender for transmitting a message calculates MAC-I (Message Authentication Code for Integrity) for each message, adds the MAC-I to each message, and then transmits the message to a receiver. The receiver calculates the XMAC-I (Expected MAC-I) for each message it receives, following the same procedure as the procedure of the sender. In addition, the receiver compares the MAC-I added to the message with the calculated XMAC-I, and determines that the received message has not been tampered with if the MAC-I matches the XMAC-I. When the MAC-I does not match the XMAC-I, the receiver determines that the received message has been tampered with. It is described that in 4G, such integrity protection is performed only for control signals, but in 5G, such integrity protection is also performed for user plane data.

CITATION LIST

Non Patent Literature
Non Patent Literature 1: 3GPP TS 33.501 V15.1.0 (2018-06)

SUMMARY OF INVENTION

Technical Problem

As the number of IoT terminals accommodated in the 5G network increases, the number of messages transmitted in the 5G network also increases. As the number of messages to be transmitted increases, the number of MAC-I also increases. The increase in the number of MAC-I increases the load of processing for generating the MAC-I at the sender and further the load of processing for authenticating messages at the receiver. That is, in the 5G network in which the number of messages to be transmitted increases, a problem occurs that the processing load on the sender and receiver increases.

An object of the present disclosure is to provide a transmission apparatus, a reception apparatus, a communication system, a communication method, and a data processing method which can suppress an increase in a processing load of a communication apparatus such as a sender and a receiver due to an increase in the number of messages to be transmitted.

Solution to Problem

A first example aspect of the present disclosure is a transmission apparatus including: a generation unit configured to generate authentication information used for confirming integrity of a plurality of data pieces using the plurality of data pieces and an integrity protection key transmitted at different timings; and a communication unit configured to transmit the plurality of data pieces and the authentication information to a reception apparatus for confirming the integrity of the plurality of data pieces.

A second example aspect of the present disclosure is a reception apparatus including: a communication unit configured to receive a plurality of data pieces transmitted and first authentication information used for confirming integrity of the plurality of data pieces at different timings; a generation unit configured to generate second authentication information using the plurality of data pieces and an integrity protection key; and a determination unit configured to determine whether or not the first authentication information matches the second authentication information, and discard the plurality of data pieces when the first authentication information does not match the second authentication information.

A third example aspect of the present disclosure is a communication system including: a transmission apparatus including: a generation unit configured to generate first authentication information used for confirming integrity of a plurality of data pieces using the plurality of data pieces and an integrity protection key transmitted at different timings; and a communication unit configured to transmit the plurality of data pieces and the first authentication information; and a reception apparatus including: a communication unit configured to receive the plurality of data pieces and the first authentication information transmitted at different timings; a generation unit configured to generate second authentication information using the plurality of data pieces and the integrity protection key; and a determination unit configured to determine whether or not the first authentication information matches the second authentication information, and discard the plurality of data pieces when the first authentication information does not match the second authentication information.

A fourth example aspect of the present disclosure is a communication method executed by a transmission apparatus. The communication method includes: generating authentication information used for confirming integrity of a plurality of data pieces using the plurality of data pieces and an integrity protection key transmitted at different timings; and transmitting the plurality of data pieces and the authentication information to a reception apparatus for confirming the integrity of the plurality of data pieces.

A fifth example aspect of the present disclosure is a data processing method executed by a reception apparatus. The data processing method includes: receiving a plurality of data pieces and first authentication information used for confirming integrity of the plurality of data pieces transmitted at different timings; generating second authentication information using the plurality of data pieces and an integrity protection key; and determining whether or not the first authentication information matches the second authentication information, and discarding the plurality of data pieces when the first authentication information does not match the second authentication information.

Advantageous Effects of Invention

According to the present disclosure, it is possible to provide a transmission apparatus, a reception apparatus, a communication system, a communication method, and a data processing method which can suppress an increase in processing load in a communication apparatus such as a sender and a receiver due to an increase in the number of messages to be transmitted.

BRIEF DESCRIPTION OF DRAWINGS

FIG. 6 shows a UE network capability information element according to the second example embodiment;

DESCRIPTION OF EMBODIMENTS

First Example Embodiment

Figure 1:
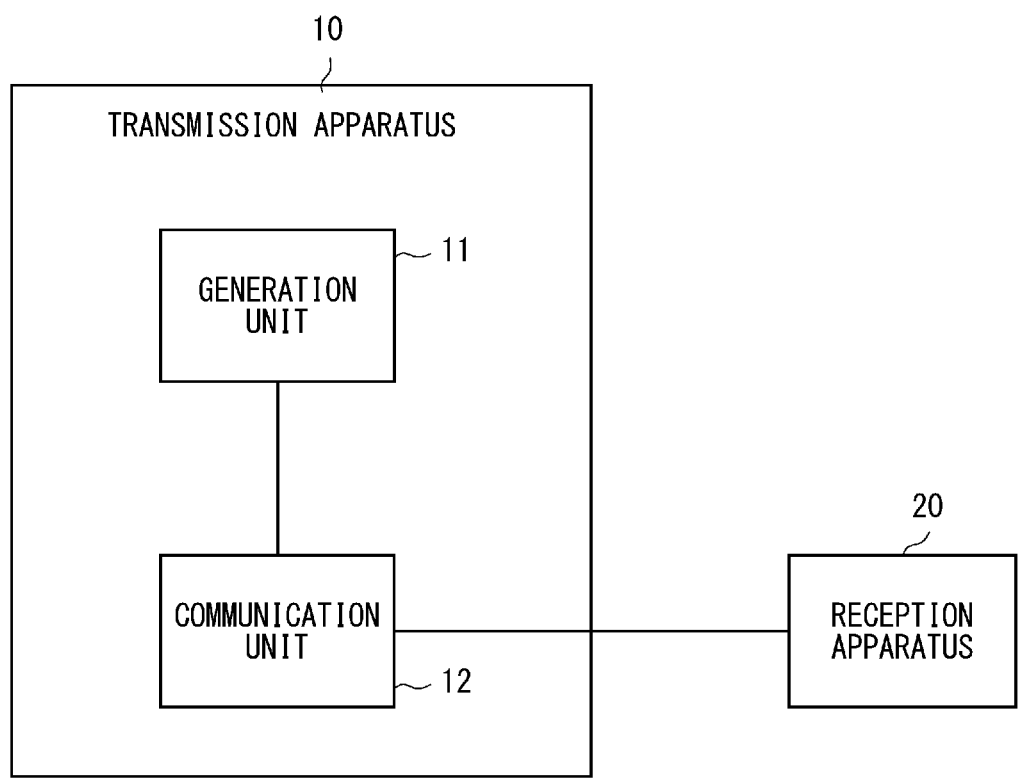
FIG. 1 is a configuration diagram of a transmission apparatus according to a first example embodiment.

Example embodiments of the present disclosure will be described below with reference to the drawings. A configuration example of a transmission apparatus 10 according to a first example embodiment will be described with reference to FIG. 1. The transmission apparatus 10 transmits data to a reception apparatus 20 wirelessly, using wired lines, or both wirelessly and using wired lines. The transmission apparatus 10 may transmit data to the reception apparatus 20 via a relay apparatus such as a base station and a core network apparatus, or may transmit data to the reception apparatus 20 without using the relay apparatus. The transmission apparatus 10 and reception apparatus 20 may be computer devices that operate by processors executing programs stored in memories. At least one of the transmission apparatus 10 and the reception apparatus 20 may be a User Equipment (UE). One of the transmission apparatus 10 and the reception apparatus 20 may be a mobile phone terminal, a smartphone terminal, a tablet type terminal, an Internet of Things (Internet Of Things) terminal, an MTC (Machine Type Communication) terminal, or the like. The other one of the transmission apparatus 10 and the reception apparatus 20 may be a server apparatus, a gateway apparatus, or the like.

The transmission apparatus 10 includes a generation unit 11 and a communication unit 12. The generation unit 11 and the communication unit 12 may be software or modules in which processing is executed by the processor executing a program stored in a memory. Alternatively, the generation unit 11 and the communication unit 12 may be hardware such as a circuit or a chip.

The generation unit 11 generates authentication information used for confirming the integrity of a plurality of data pieces using the plurality of data pieces and an integrity protection key transmitted at different timings. The different timing may be, for example, a communication timing determined according to a predetermined communication interval. Alternatively, the different timing may be a communication timing determined according to a freely-selected communication interval.

The data may be, for example, data added to a packet header or data or a payload added to a frame header. The packet header may be, for example, an IP (Internet Protocol) header. The frame header may be, for example, a MAC (Media Access Control) header. That is, the data may be the data added to the header in any hierarchy. Alternatively, the data may be a packet including a packet header or an IP packet. Further, the data may be a frame including a frame header. Alternatively, the data may be referred to as a segment. The data may include headers in any hierarchy. Alternatively, the data may be data transmitted in accordance with a protocol defined by the 3GPP.

The integrity protection key is, for example, a key used to prevent tampering of a plurality of data pieces transmitted from the transmission apparatus 10 to the reception apparatus 20. Specifically, the integrity protection key is used to generate the authentication information that is used to verify the integrity of the plurality of data pieces in the reception apparatus 20. The reception apparatus 20 confirms the integrity of the received data pieces by confirming the authentication information. The generation unit 11 generates one piece of the authentication information associated with the plurality of data pieces. Alternatively, the generation unit 11 generates a smaller number of pieces of the authentication information than the number of data pieces among the plurality of data pieces.

The communication unit 12 transmits the plurality of data pieces and the authentication information to the reception apparatus 20. The communication unit 12 transmits the authentication information to the reception apparatus 20 at the same timing as any of the plurality of data pieces.

The transmission apparatus 10 executes the following communication method. First, the transmission apparatus 10 generates the authentication information used to confirm the integrity of the plurality of data pieces using the plurality of data pieces and integrity protection key transmitted at different timings. Next, the transmission apparatus 10 transmits the plurality of data pieces and the authentication information to the reception apparatus for confirming the integrity of the plurality of data pieces.

As described above, the transmission apparatus 10 can transmit, to the reception apparatus 20, a smaller number of the authentication information pieces than the number of data pieces to be transmitted to the reception apparatus 20. As a result, the load of the processing for generating and transmitting the authentication information in the transmission apparatus 10 can be reduced compared with the case where the transmission apparatus 10 transmits, to the reception apparatus 20, the same number of pieces of the authentication information as the number of data pieces to be transmitted to the reception apparatus 20.

Further, it is possible to reduce the load of the processing for analyzing the authentication information in the reception apparatus 20 compared with the case where the same number of pieces of the authentication information as the number of data pieces to be received are received.

Furthermore, the amount of data transmitted between the transmission apparatus 10 and the reception apparatus 20 can be reduced compared with the case where the transmission apparatus 10 transmits, to the reception apparatus 20, the same number of pieces of the authentication information as the number of data pieces transmitted to the reception apparatus 20.

Second Example Embodiment

Figure 2:
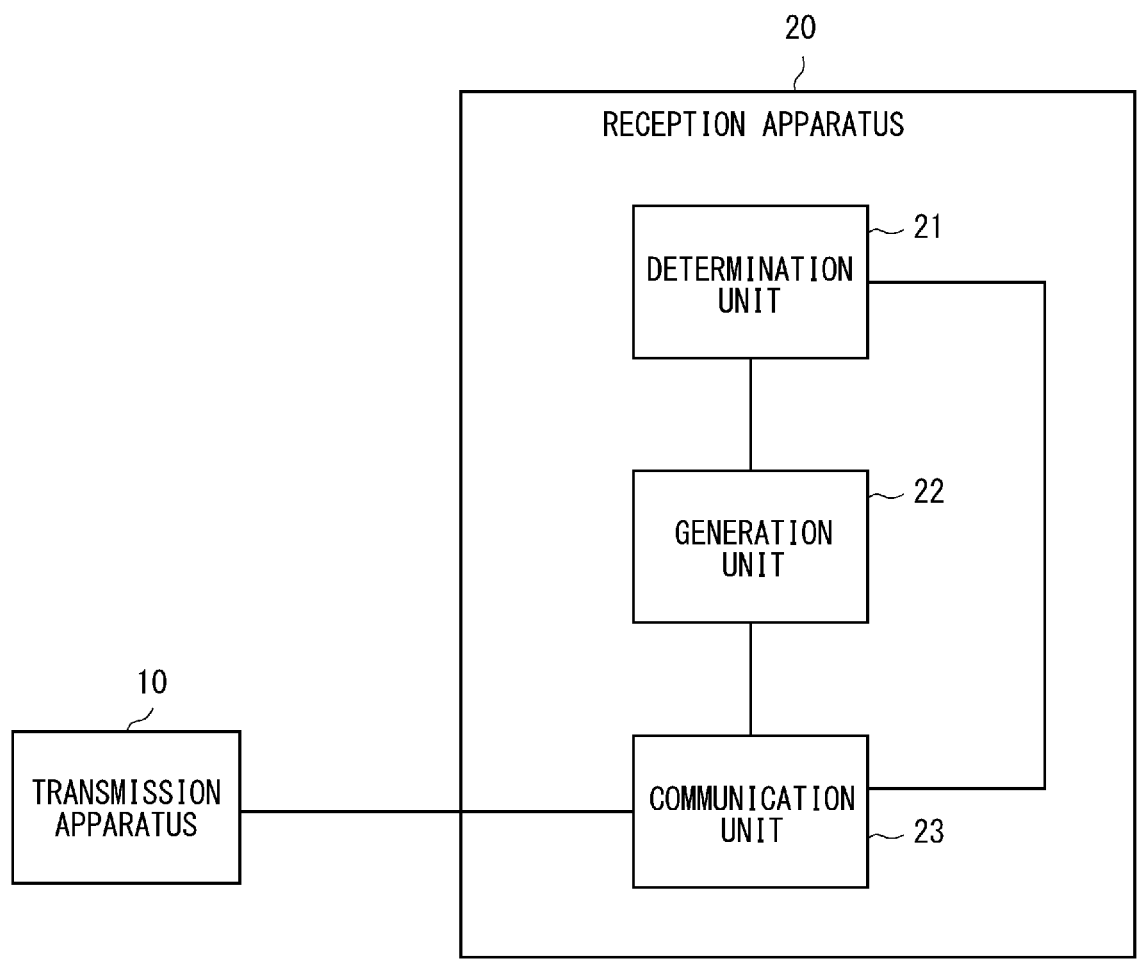
FIG. 2 is a configuration diagram of a communication system according to a second example embodiment.

Next, a configuration example of a communication system according to a second example embodiment will be described with reference to FIG. 2. The communication system of FIG. 2 includes a transmission apparatus 10 and a reception apparatus 20. Since the transmission apparatus 10 is similar to the transmission apparatus 10 of FIG. 1, a detailed description of the transmission apparatus 10 of FIG. 2 is omitted.

The reception apparatus 20 includes a determination unit 21, a generation unit 22, and a communication unit 23. The determination unit 21, the generation unit 22, and the communication unit 23 may be software or modules in which processing is executed by the processor executing a program stored in the memory. Alternatively, the determination unit 21, the generation unit 22, and the communication unit 23 may be hardware such as a circuit or a chip.

The communication unit 23 receives a plurality of data pieces and authentication information used to confirm the integrity of the plurality of data pieces transmitted at different timings. The communication unit 23 outputs the plurality of received data pieces to the generation unit 22. Furthermore, the communication unit 23 outputs the received authentication information to the determination unit 21.

The generation unit 22 generates the authentication information using the plurality of data pieces and an integrity assurance key received from the communication unit 23. The integrity assurance key used to generate the authentication information is the same as the integrity assurance key used in the transmission apparatus 10. The generation unit 22 generates one piece of the authentication information associated with the plurality of data pieces. Alternatively, the generation unit 22 generates a smaller number of pieces of the authentication information than the number of data pieces among the plurality of data pieces. The generation unit 22 may generate the same number of pieces of the authentication information as the number of pieces of the authentication information transmitted from the transmission apparatus 10. The generation unit 22 outputs the generated authentication information to the determination unit 21.

The determination unit 21 determines whether or not the authentication information received from the transmission apparatus 10 matches the authentication information generated by the generation unit 22. The reception apparatus 20 confirms, by the determination unit 21, the integrity of the plurality of data pieces received from the transmission apparatus 10. When the authentication information received from the transmission apparatus 10 matches the authentication information generated by the generation unit 22, the determination unit 21 determines that the plurality of data pieces received from the transmission apparatus 10 have not been tampered with (the plurality of data pieces have integrity). On the contrary, when the authentication information received from the transmission apparatus 10 does not match the authentication information generated by the generation unit 22, the determination unit 21 determines that the plurality of data pieces received from the transmission apparatus 10 have been tampered with (the plurality of data pieces do not have integrity). In this case, the determination unit 21 determines to discard the plurality of data pieces received from the transmission apparatus 10.

Figure 3:
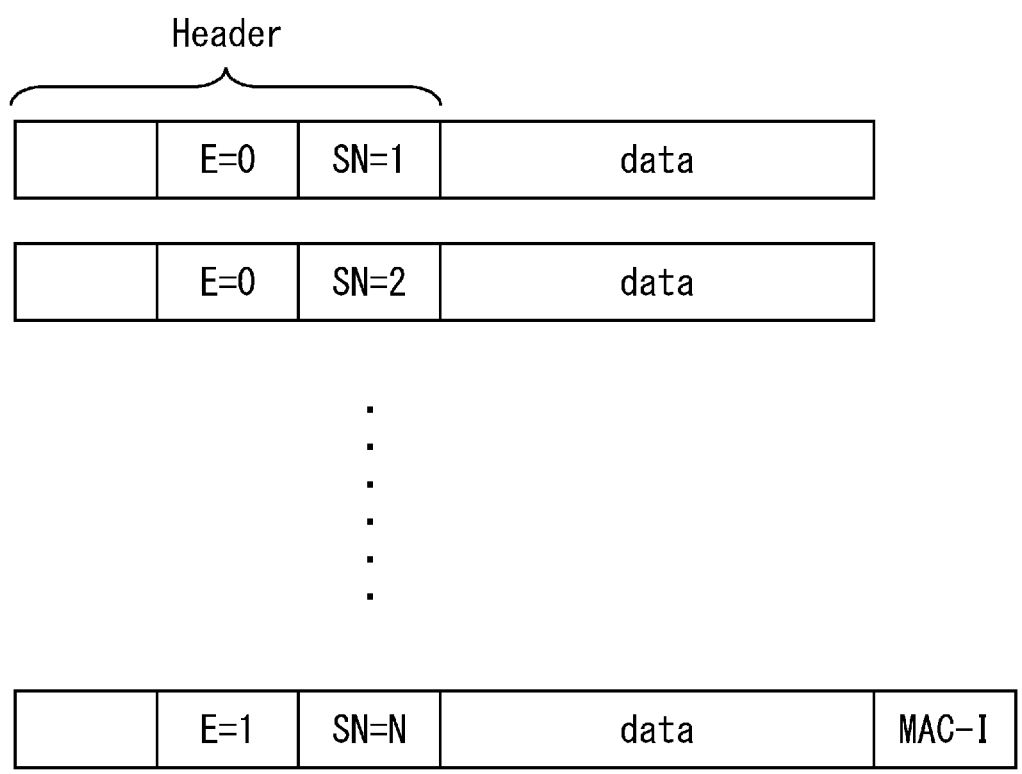
FIG. 3 shows a configuration of data according to the second example embodiment.

Next, a configuration of data transmitted by the transmission apparatus 10 will be described with reference to FIG. 3. FIG. 3 shows a configuration in which data is added to the header. FIG. 3 shows a configuration in which MAC-I is added to a data piece and a configuration in which the MAC-I is not added to a data piece. The MAC-I corresponds to the authentication information generated by the generation unit 11. The header includes a field for setting E=0 or E=1 and a field indicating SN (Sequence Number). The field for setting the value of E indicates the presence or absence of the MAC-I. For example, when E=0 is set, it indicates that the MAC-I is not added to the data piece. When E=1 is set, it indicates that the MAC-I is added to the data piece.

FIG. 3 shows that the MAC-I is added to the data in which SN=N is set in the header. FIG. 3 shows that the MAC-I in which SN=N is set is calculated using data pieces in which SN=1 to SN=N are set.

The header may also include a field indicating whether the data is important or not. For example, if the data is important, P=1 may be set in the header, whereas if the data is not important, P=0 may be set in the header. The field in which P=1 or P=0 is set may be applied only to the configuration of the data to which the MAC-I is added.

When P=1 is set in the received data piece, the determination unit 20 of the reception apparatus 21 always confirm the integrity of the received data piece, and may discard the data if the integrity cannot be confirmed. When P=0 is set in the received data piece, and the CPU load is high or the reception bit rate is high, the determination unit 20 of the reception apparatus 21 does not need to confirm the integrity of the received data pieces. When P=0 is set in the received data piece, and the CPU load is not high or the received bit rate is not high, the determination unit 20 of the reception apparatus 21 may confirm the integrity of the received data pieces.

Figure 4:
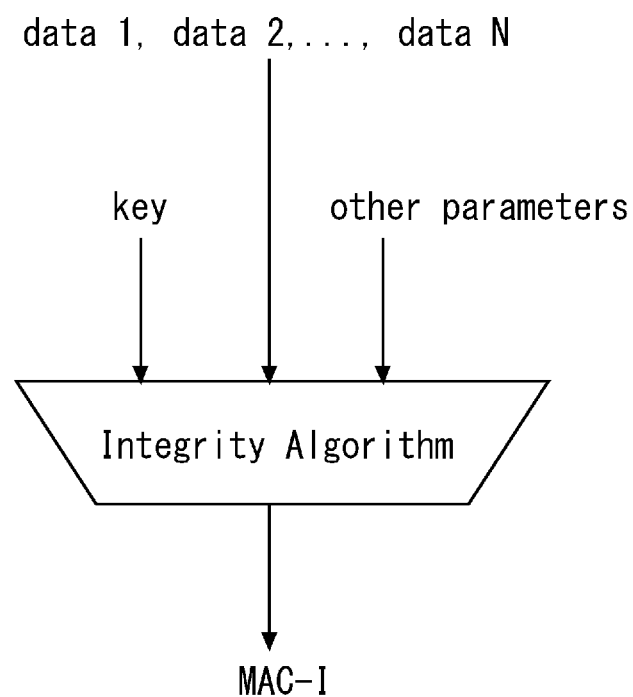
FIG. 4 is a diagram schematically showing a method of calculating MAC-I according to the second example embodiment.

Here, an outline of a method of calculating the MAC-I in the transmission apparatus 10 will be described with reference to FIG. 4. FIG. 4 shows that as an input to an Integrity Algorithm, the MAC-I is output or calculated using a security key, a plurality of data pieces (data 1, data 2 through data N), and other parameters.

The security key may be, for example, an Integrity Key of a specific length. The specific length may be, for example, 128 bits or 64 bits. The security key corresponds to the integrity protection key. The data 1 is data added to SN=1, and the data N is data added to SN=N. The other parameters may include, for example, the value of SN and may include parameters other than the SN included in the header. If the other parameters include the value of SN, the header may not include the field indicating SN. The other parameters may also include a security algorithm. For example, an EIA (Evolved Packet System Integrity Algorithm) may be used as the security algorithm.

The MAC-I calculated using the security key, the plurality of data pieces (data 1, data 2 through data N), and the other parameters is used to confirm the integrity of the plurality of data pieces (data 1, data 2 through data N). That is, the MAC-I calculated using the security key, the plurality of data pieces (data 1, data 2 through data N), and the other parameters is used to confirm whether or not the plurality of data pieces (data 1, data 2 through data N) have been tampered with (to confirm the integrity of the plurality of data pieces).

Figure 5:
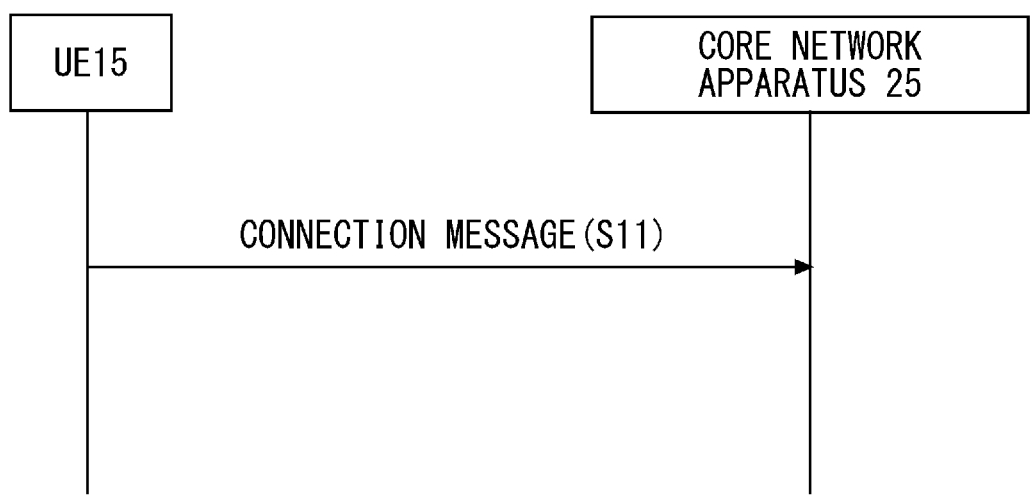
FIG. 5 is a diagram showing a flow of processing related to a setting of security information according to the second example embodiment.

Next, a flow of processing related to the setting of security information between a UE (User Equipment) 15 and a core network apparatus 25 will be described with reference to FIG. 5. The term UE 15 is used as a generic term of a communication terminal in the 3GPP. The core network apparatus 25 is, for example, an apparatus for performing mobility management or subscriber information management of the UE 15. The core network apparatus 25 may be, for example, an AMF (Access Management Function) entity. The UE 15 and the core network apparatus 25 can also be a transmission apparatus or a reception apparatus.

First, the UE transmits a connection message to the core network apparatus in Registration processing executed when the mobile network is used (S11). The connection message includes an UE network capability information element shown in FIG. 6. At the position (a) in FIG. 6, a value indicating whether or not the UE has a function of calculating the MAC-I used for confirming the integrity of the plurality of data pieces is set. For example, if the UE has a function of calculating the MAC-I used to confirm the integrity of the plurality of data pieces, 1 is set in (a). If the UE does not have the function of calculating the MAC-I used to verify the integrity of the plurality of data pieces, 0 is set in (a).

At the position (b) in FIG. 6, a value indicating whether or not it is possible to vary the number N of data pieces whose integrity can be confirmed in one MAC-I is set. Varying the number N of data pieces whose integrity can be confirmed in one MAC-I may be, for example, changing the number N of data pieces each time the MAC-I is calculated. When the number N of data pieces whose integrity can be confirmed in one MAC-I can be made variable, 1 is set in (b). When the number N of data pieces whose integrity can be confirmed in one MAC-I cannot be made variable, 0 is set in (b).

The value of N is set at the position (c) in FIG. 6. For example, when (b) indicates that the number N of data pieces whose integrity can be confirmed in one MAC-I is variable, the maximum value of N may be set in (c). On the contrary, if (b) indicates that the number N of data pieces whose integrity can be confirmed in one MAC-I cannot be varied, a predetermined value, namely, a fixed value, may be set in (c).

An index value indicating the value of N may be set in (c). For example, assume that a table defined as Table={index1=4, index2=8, index3=16, index4=32} is shared between the UE and the core network apparatus. In this case, instead of setting 4, 8, 16, or 32 in the value of N, the index value 1, 2, 3, or 4 may be set in (c).

Figure 7:
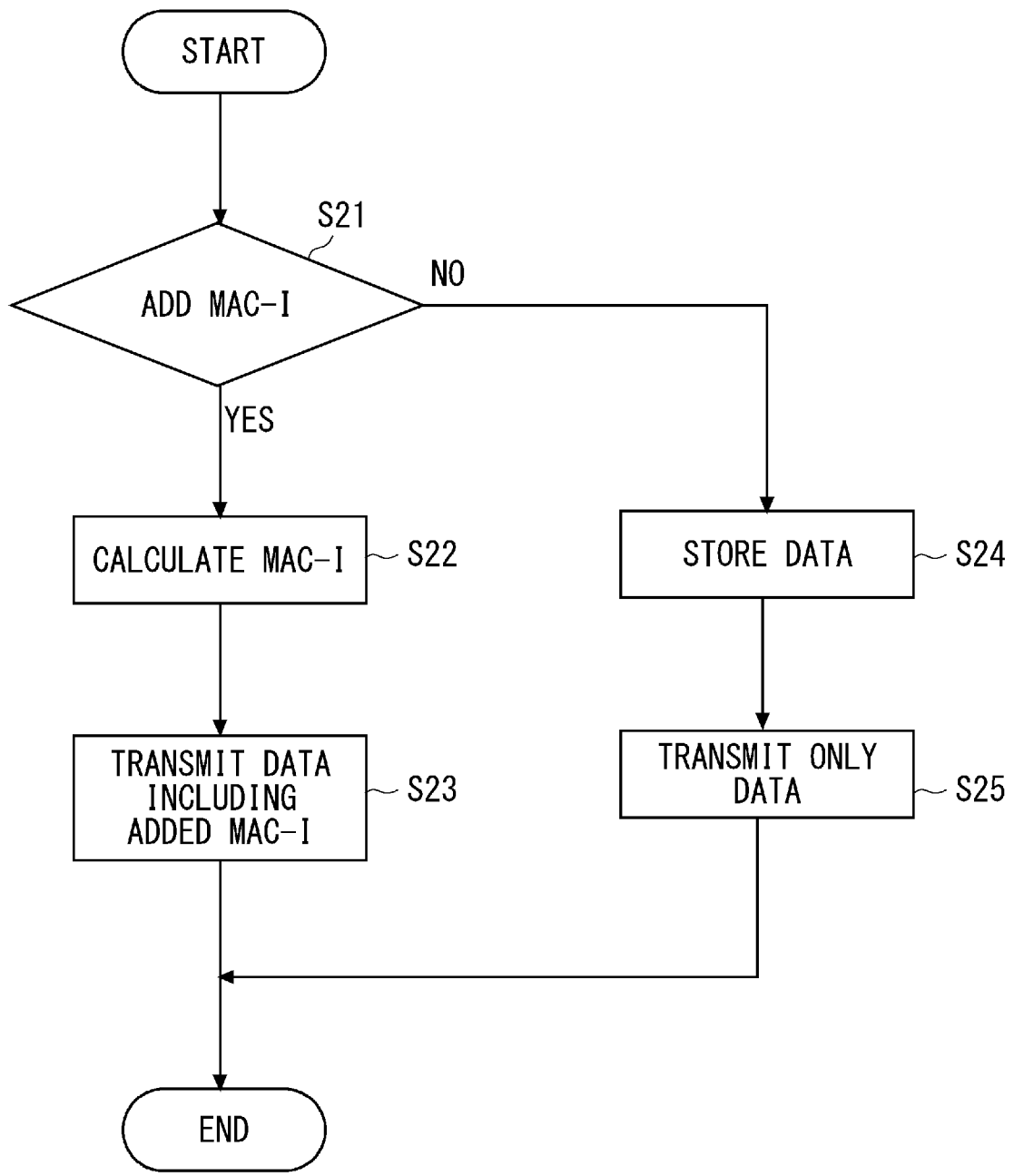
FIG. 7 is a diagram showing a flow of data transmission processing according to the second example embodiment.

Next, a flow of data transmission processing in the transmission apparatus 10 according to the second example embodiment will be described with reference to FIG. 7. First, the transmission apparatus 10 determines whether to add the MAC-I to the data piece to be transmitted (S21). If the number N of data pieces whose integrity can be confirmed in one MAC-I is a fixed value, the transmission apparatus 10 counts the number of transmitted data pieces. When the transmission apparatus 10 transmits the Nth data piece, the transmission apparatus 10 determines that the MAC-I is added to the data piece to be transmitted so as to transmit the data piece. When the data piece to be transmitted is one of first to N-lth data pieces, the transmission apparatus 10 determines that the MAC-I is not added to the data piece to be transmitted. When the transmission apparatus 10 transmits the Nth data piece, the transmission apparatus 10 counts the data piece to be transmitted next as a first data.

If the number N of data pieces whose integrity can be confirmed in one MAC-I is variable, for example, the transmission apparatus 10 may determine the number N of data pieces based on the current data transmission rate. Specifically, when the current data transmission rate is higher than a threshold, the transmission apparatus 10 increases N to reduce the overhead caused by the MAC-I. Increasing N means increasing the data size used to calculate the MAC-I. The transmission apparatus 10 reduces N when the current data transmission rate is lower than the threshold.

The transmission apparatus 10 determines that the MAC-I is added to the data piece to be transmitted when the data piece to be transmitted is Nth data piece, which the number N is the number of data pieces determined based on the data transmission rate. When the data piece to be transmitted is one of the first to N-lth data pieces, the transmission apparatus 10 determines that the MAC-I is not added to the data piece to be transmitted.

Next, if it is determined in Step S21 that the MAC-I is added to the data piece to be transmitted, the transmission apparatus 10 calculates the MAC-I (S22). Specifically, the generation unit 10 of the transmission apparatus 11 inputs the stored first to N-lth data pieces and the Nth data piece to the Integrity Algorithm. The generation unit 11 of the transmission apparatus 10 further inputs the security key and other parameters to the Integrity Algorithm. As a result, the generation unit 11 generates the MAC-I for the first to Nth data pieces.

Next, the communication unit 12 of the transmission apparatus 10 adds the MAC-I calculated by the generation unit 11 to the Nth data piece, and transmits the Nth data piece to the reception apparatus 20 (S23). At this time, the communication unit 12 sets E=1 in the field of the header added to the data piece.

If it is determined in Step S21 that the MAC-I is not to be added to the data piece to be transmitted, the transmission apparatus 10 stores the first to N-lth data pieces to be transmitted. Specifically, the transmission apparatus 10 stores a copy of the data piece to be transmitted in the memory or the like in the transmission apparatus 10.

Next, the generation unit 10 of the transmission apparatus 11 transmits the first to N-lth data pieces to the reception apparatus 20 (S25). In Step S25, the communication unit 12 does not add the MAC-I to the data piece. In other words, the communication unit 12 transmits only the first to N-lth data pieces to the reception apparatus 20. The communication unit 12 sets E=0 in the field of the header added to the data piece.

An example in which, when the number N of data pieces whose integrity can be confirmed in one MAC-I is variable, the transmission apparatus 10 determines the number N of data pieces based on the current data transmission rate in Step S21 has been described. However, the present disclosure is not limited to this.

For example, when the transmission apparatus 10 is in an idle mode and in a period in which data cannot be transmitted, the transmission apparatus 10 buffers the data pieces. The transmission apparatus 10 transmits all the buffered data pieces since the idle mode to the reception apparatus 20 during a period in which data such as a connected mode can be transmitted. In this case, the transmission apparatus 10 may determine N as the number of buffered data pieces. That is, the transmission apparatus 10 may calculate one MAC-I for all the buffered data pieces.

When the data size of the data piece to be transmitted is larger than a threshold, the transmission apparatus 10 divides the data according to the limitation of the packet size and transmits the divided data pieces to the reception apparatus 20. The transmission apparatus 10 may determine N as the number of divided data pieces. That is, the transmission apparatus 10 may calculate one MAC-I for all the divided data pieces.

Figure 8:
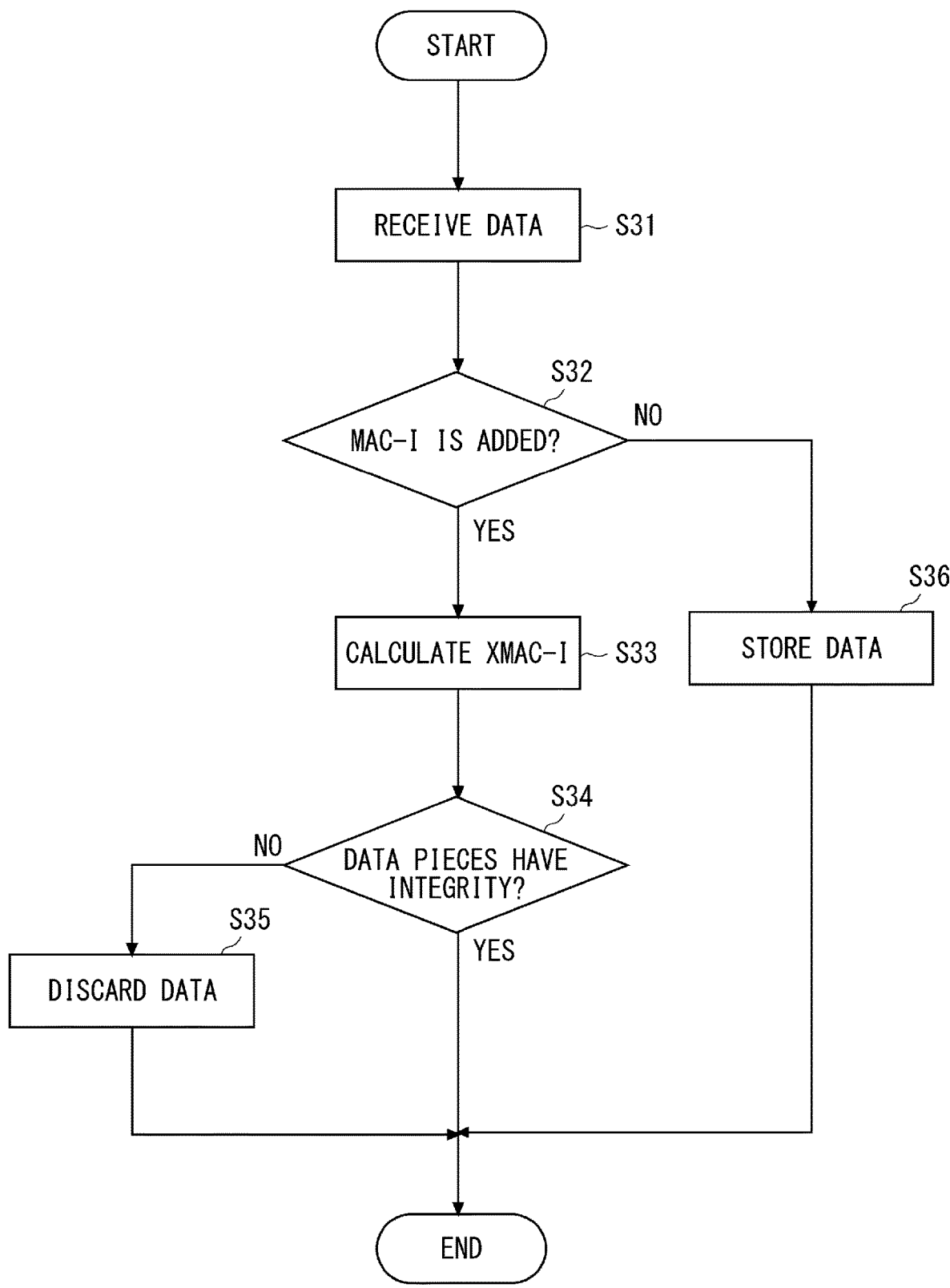
FIG. 8 is a diagram showing a flow of data reception processing according to the second example embodiment.

Next, a flow of data reception processing in the reception apparatus 20 according to the second example embodiment will be described with reference to FIG. 8. First, the communication unit 20 of the reception apparatus 23 receives the data transmitted from the transmission apparatus 10 (S31).

Next, the communication unit 23 of the reception apparatus 20 determines whether or not the MAC-I is added to the received data pieces (S32). Specifically, the communication unit 23 determines whether E=1 or E=0 is set in the header added to the received data piece.

Next, when the communication unit 23 determines that E=1 is set in the header added to the received data piece and the MAC-I is added thereto, the generation unit 22 calculates XMAC-I (S33). The XMAC-I is authentication information generated or calculated by the generation unit 22. The calculation method of the XMAC-I is the same as that of MAC-I in FIG. 4. Next, the determination unit 21 compares the XMAC-I calculated by the generation unit 22 with the MAC-I added to the data received by the communication unit 23 to confirm the integrity of the received data pieces (S34). When the XMAC-I calculated by the generation unit 22 matches the MAC-I added to the data received by the communication unit 23, the determination unit 21 determines that the first to the Nth received data pieces have integrity. In other words, data having integrity means that the data has not been tampered with. When the determination unit 21 determines that the data has integrity, it continues the data reception processing.

When the XMAC-I calculated by the generation unit 22 does not match the MAC-I added to the data received by the communication unit 23, the determination unit 21 determines that the first to the Nth received data pieces do not have integrity. The data not having integrity means that at least one of the first to Nth received data pieces has been tampered with. If the determination unit 21 determines that the data pieces do not have integrity, it discards the first to Nth received data pieces (S35). In other words, if the determination unit 21 determines that the data pieces do not have integrity, it discards the Nth data piece and the stored first to N-lth data pieces received in Step S31.

In Step S32, if the communication unit 23 determines that the MAC-I is not added to the received data piece, it stores the received data piece in the memory or the like.

As described above, the transmission apparatus 10 can generate or calculate the MAC-I for the plurality of data pieces. Further, the transmission apparatus 10 can add the MAC-I only to the Nth data piece, instead of adding the MAC-I to each data piece. In this way, since the transmission apparatus 10 calculates the MAC-I only when transmitting the Nth data piece, the MAC-I calculation processing can be reduced as compared with the case where the MAC-I is calculated for all data pieces.

Further, the reception apparatus 20 does not always execute the processing of confirming the integrity of the data pieces when each data piece is received and instead confirms the integrity of the data pieces only when the Nth data piece is received. As a result, the load of the processing for confirming the integrity of the data in the reception apparatus 20 can be reduced as compared with the case where the processing for always confirming the integrity of the data is executed when the respective data pieces are received.

In addition, the amount of data transmitted from the transmission apparatus 10 to the reception apparatus 20 can be reduced as compared with the case where the MAC-I is added to each data piece.

In the second example embodiment, one MAC-I is calculated for the first to Nth data pieces. However, for example, two or more MAC-I less than N may be calculated for the first to Nth data pieces.

Third Example Embodiment

Figure 9:
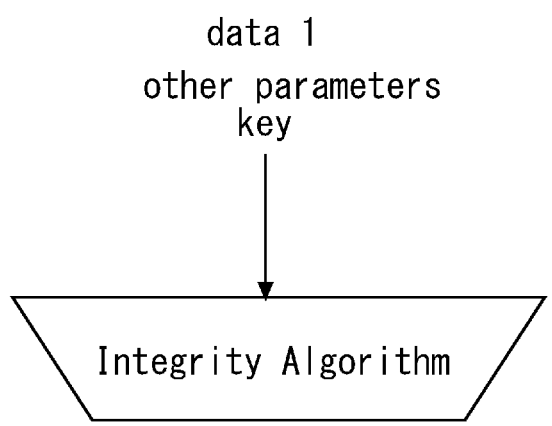
FIG. 9 is a diagram schematically showing a method of calculating MAC-I according to a third example embodiment.
Figure 10:
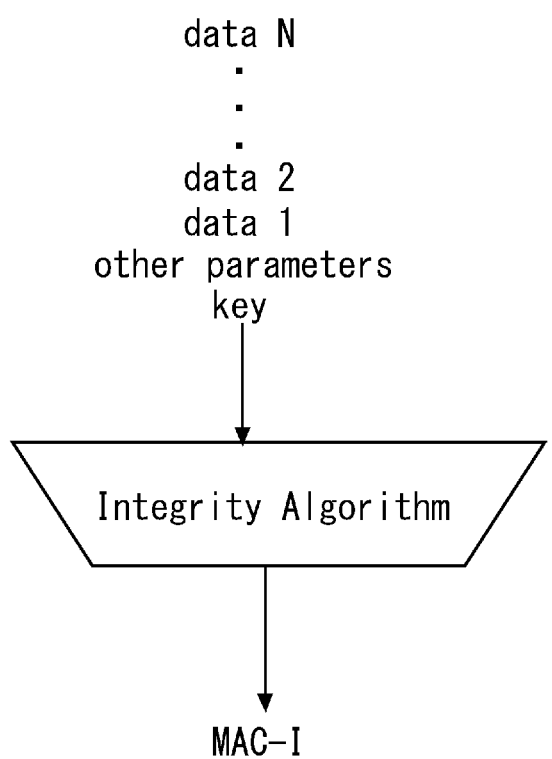
FIG. 10 is a diagram schematically showing a method of calculating MAC-I according to the third example embodiment.

Next, an outline of a method for calculating the MAC-I different from that shown in FIG. 4 will be described with reference to FIGS. 9 and 10. FIG. 4 shows that the first to Nth data pieces are collectively input to the Integrity Algorithm. On the other hand, FIGS. 9 and 10 show that the first to Nth data pieces are sequentially input to the Integrity Algorithm. FIG. 9 shows a state in which the first data piece is input to the Integrity Algorithm. When the transmission apparatus 10 transmits the first data piece, the transmission apparatus 10 inputs the security key, the other parameters and the first data piece to the Integrity Algorithm. At this time, the MAC-I is not calculated from the Integrity Algorithm, and the transmission apparatus 10 waits for the second and subsequent data pieces to be input to the Integrity Algorithm. At this time, the security key, the other parameters, and an intermediate value obtained when the first data piece is input to the Integrity Algorithm may be stored in the memory or the like. The intermediate value is a variable that is held inside the Integrity Algorithm. The intermediate value is, for example, a state variable that is updated each time one bit of the value is input to the Integrity Algorithm.

FIG. 10 shows a state in which the second to Nth data pieces are further input to the Integrity Algorithm after the state shown in FIG. 9. When the transmission apparatus 10 transmits the second and subsequent data pieces, the transmission apparatus 10 inputs the second to Nth data pieces to the Integrity Algorithm. The transmission apparatus 10 may update the intermediate value each time one of the first to N-lth data pieces is input to the Integrity Algorithm. When the Nth data piece is input, the transmission apparatus 10 generates or calculates the MAC-I and then outputs the MAC-I.

As described above, the transmission apparatus 10 may sequentially input the plurality of data pieces to the Integrity Algorithm when calculating the MAC-I. The transmission apparatus 10 stores the intermediate value when each data piece is input to the Integrity Algorithm, so that the input the data pieces to the Integrity Algorithm and the MAC-I calculation processing can be resumed based on the intermediate value even when the data input is interrupted. In the third example embodiment, as in the second example embodiment, the amount of data transmitted from the transmission apparatus 10 to the reception apparatus 20 can be reduced as compared with the case where the MAC-I is added to each data piece. The calculation method of the MAC-I in this example embodiment can also be applied to the calculation method of the XMAC-I in the reception apparatus 20.

Fourth Example Embodiment

Figure 11:
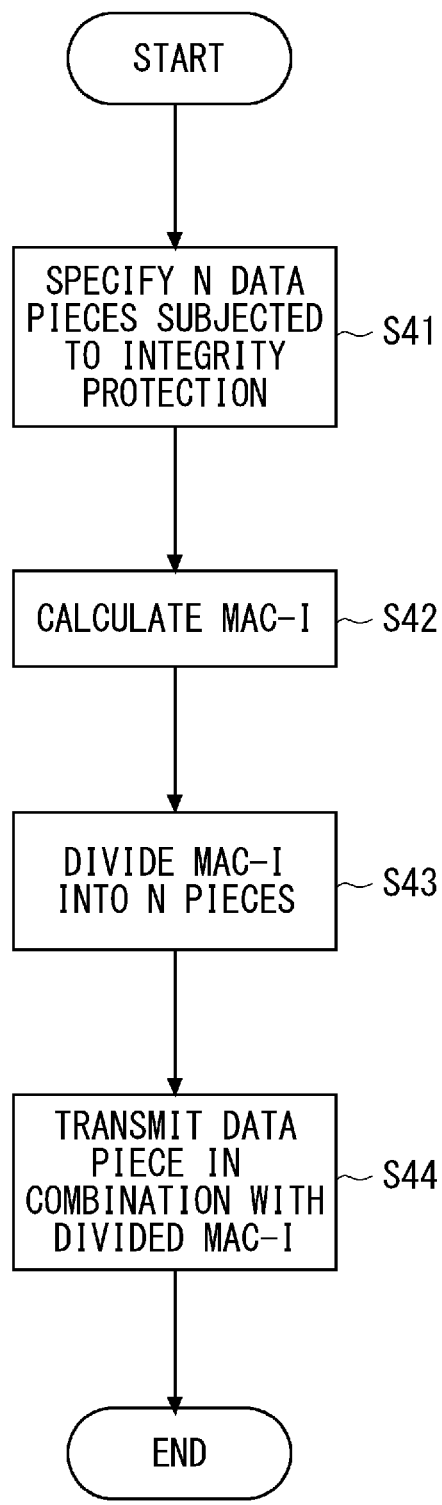
FIG. 11 is a diagram showing a flow of data transmission processing according to a fourth example embodiment.

Next, a flow of data transmission processing in the transmission apparatus 10 according to a fourth example embodiment will be described with reference to FIG. 11. First, the generation unit 11 specifies N data pieces to be subjected to integrity protection (S41). In other words, the generation unit 11 specifies N data pieces to be input to the Integrity Algorithm. Next, the generation unit 11 inputs the specified N data pieces to the Integrity Algorithm and calculates the MAC-I (S42).

Next, the generation unit 11 divides the calculated MAC-I into N pieces (S43). Next, the generation unit 11 adds the divided MAC-I to the N data pieces, respectively, and sequentially transmits the N data pieces to which the divided MAC-I is added (S44). In this case, the divided MAC-I is added to all N data pieces. Thus, the generation unit 11 may set E=1 in the header added to the Nth data piece and set E=0 in the header added to other data pieces in the field used to indicate whether or not the MAC-I is set. In other words, the generation unit 11 may set E=1 in the header added to the data piece to be transmitted last among the N data pieces, and set E=0 in the header added to the other data pieces.

Figure 12:
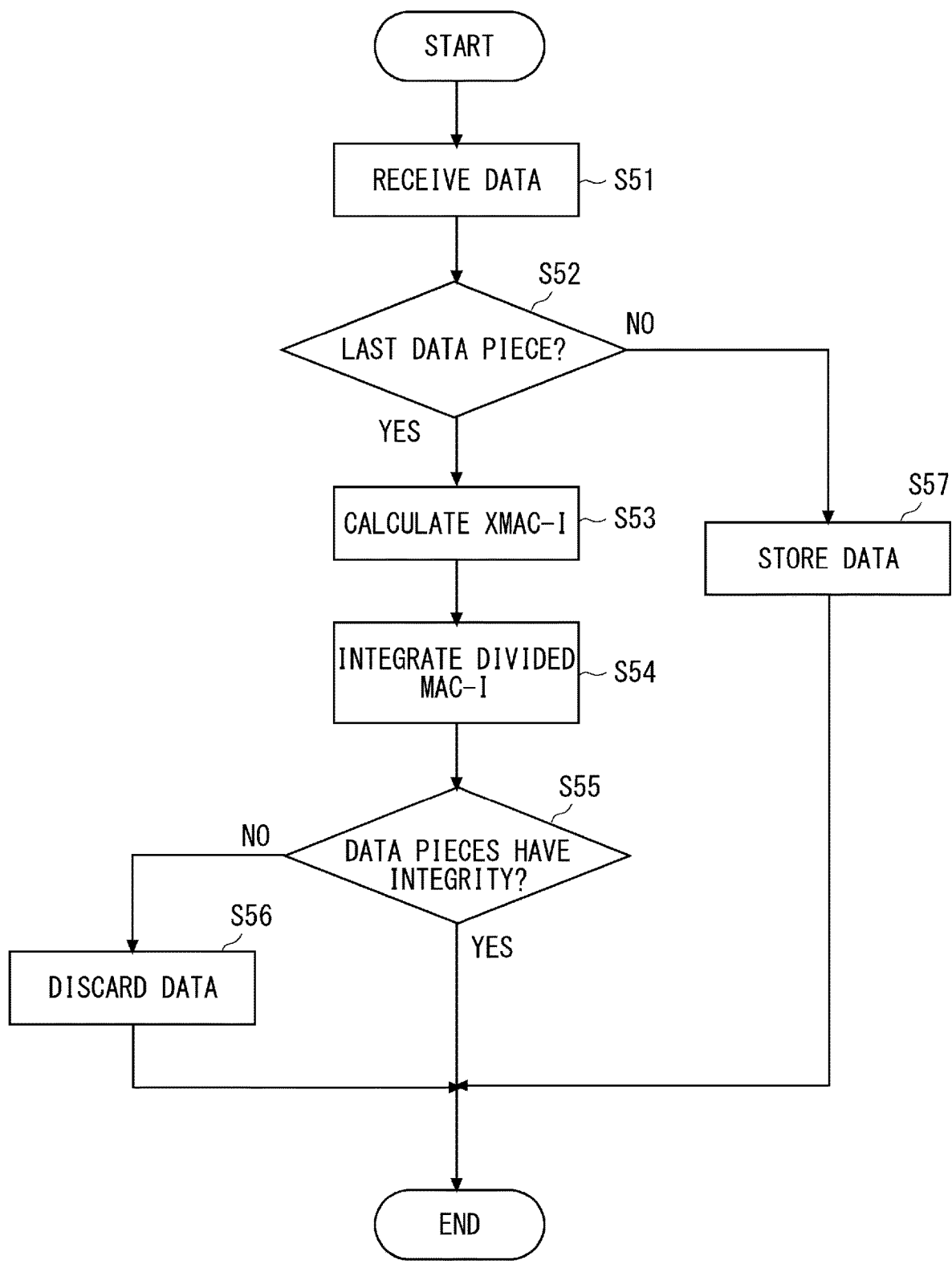
FIG. 12 is a diagram showing a flow of data reception processing according to the fourth example embodiment.

Next, a flow of data reception processing in the reception apparatus 20 according to the fourth example embodiment will be described with reference to FIG. 12. First, the communication unit 20 of the reception apparatus 23 receives the data transmitted from the transmission apparatus 10 (S51).

Next, the communication unit 20 of the reception apparatus 23 determines whether or not the received data piece is the Nth data piece, namely, the last data piece (S52). Specifically, the communication unit 23 determines whether E=1 or E=0 is set in the header attached to the received data piece.

Next, when the communication unit 23 determines that E=1 is set in the header added to the received data piece and the received data piece is the last data piece, the generation unit 22 calculates the XMAC-I (S53).

Next, the determination unit 21 acquires the N divided MAC-I from the communication unit 23, and integrates the N divided MAC-I (S54). Steps S55 to S57 are the same as Steps S34 to S36 in FIG. 8, respectively, and therefore detailed description of Steps S55 to S57 is omitted.

As described above, in the fourth example embodiment, the transmission apparatus 10 can divide one MAC-I generated for the plurality of data pieces, add the divided MAC-I to each data piece, and transmit the data pieces to the reception apparatus 20. By doing so, in the fourth example embodiment, the same effects as that achieved by the second example embodiment can be achieved.

Fifth Example Embodiment

Figure 13:
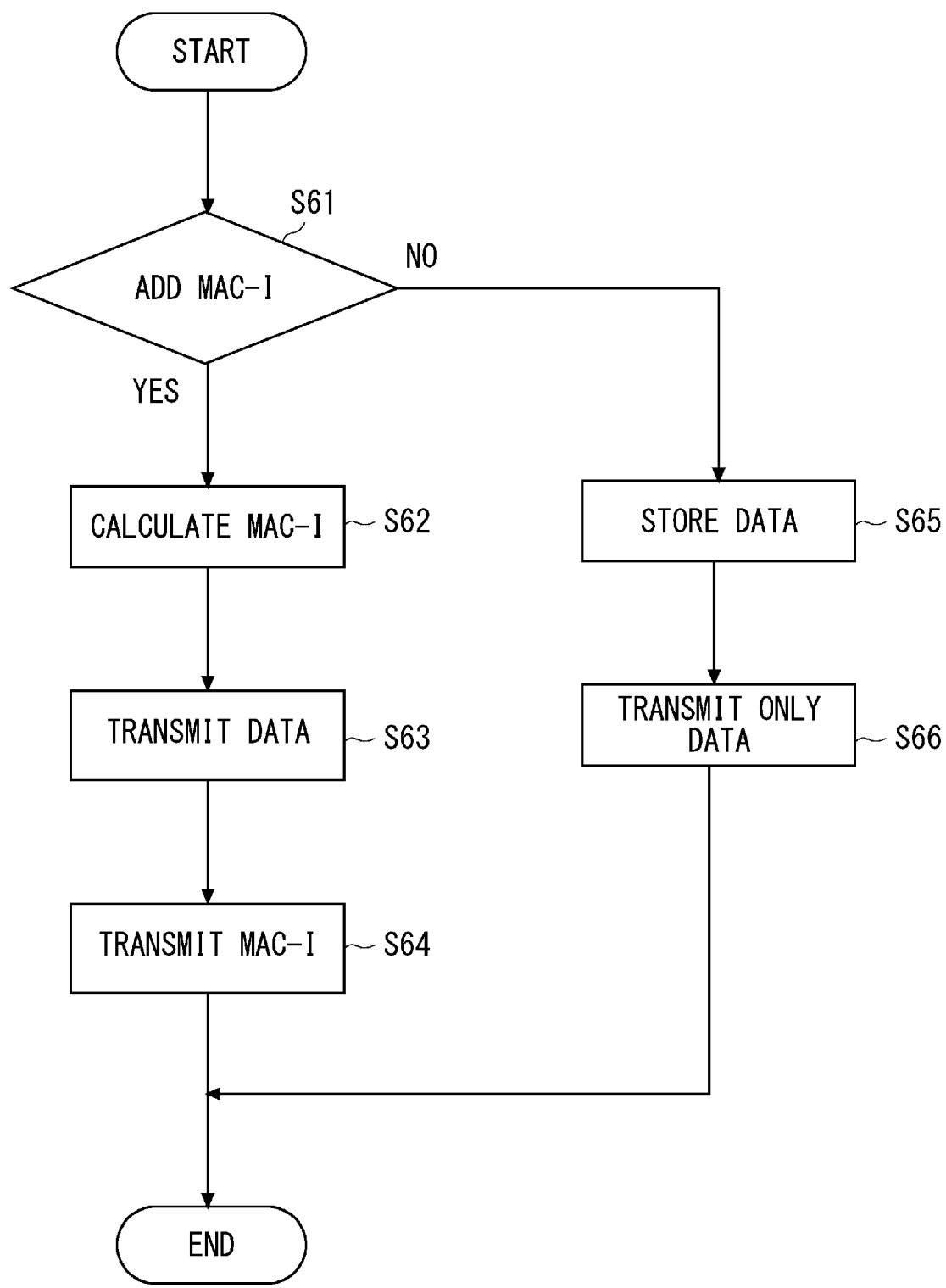
FIG. 13 is a diagram showing a flow of data transmission processing according to a fifth example embodiment.

Next, a flow of data transmission processing in the transmission apparatus 10 according to a fifth example embodiment will be described with reference to FIG. 13. Steps S61 and S62 are the same as Steps S21 and S22 in FIG. 7, respectively, and therefore detailed description of Steps S61 and S62 is omitted.

In Step S63, the communication unit 12 transmits only the Nth data piece to the reception apparatus 20 without adding the MAC-I to the Nth data piece (S63). In this case, the MAC-I is not added to any of the N data pieces. Therefore, the generation unit 11 may set E=1 in the header added to the Nth data piece and set E=0 in the header added to other data pieces in the field used to indicate whether or not the MAC-I is set. In other words, the generation unit 11 may set E=1 in the header added to the data piece to be transmitted last among the N data pieces, and set E=0 in the header added to the other data pieces.

Next, the communication unit 12 adds the MAC-I to the header different from the header added to the Nth data piece, and transmits the MAC-I to the reception apparatus 20 (S64). That is, the communication unit 12 transmits the MAC-I to the reception apparatus 20 at a timing different from the timing at which the first to Nth data pieces are transmitted. Steps S65 and S66 are the same as Steps S24 and S25 in FIG. 7, respectively, and therefore detailed description of the Steps S65 and S66 is omitted.

Figure 14:
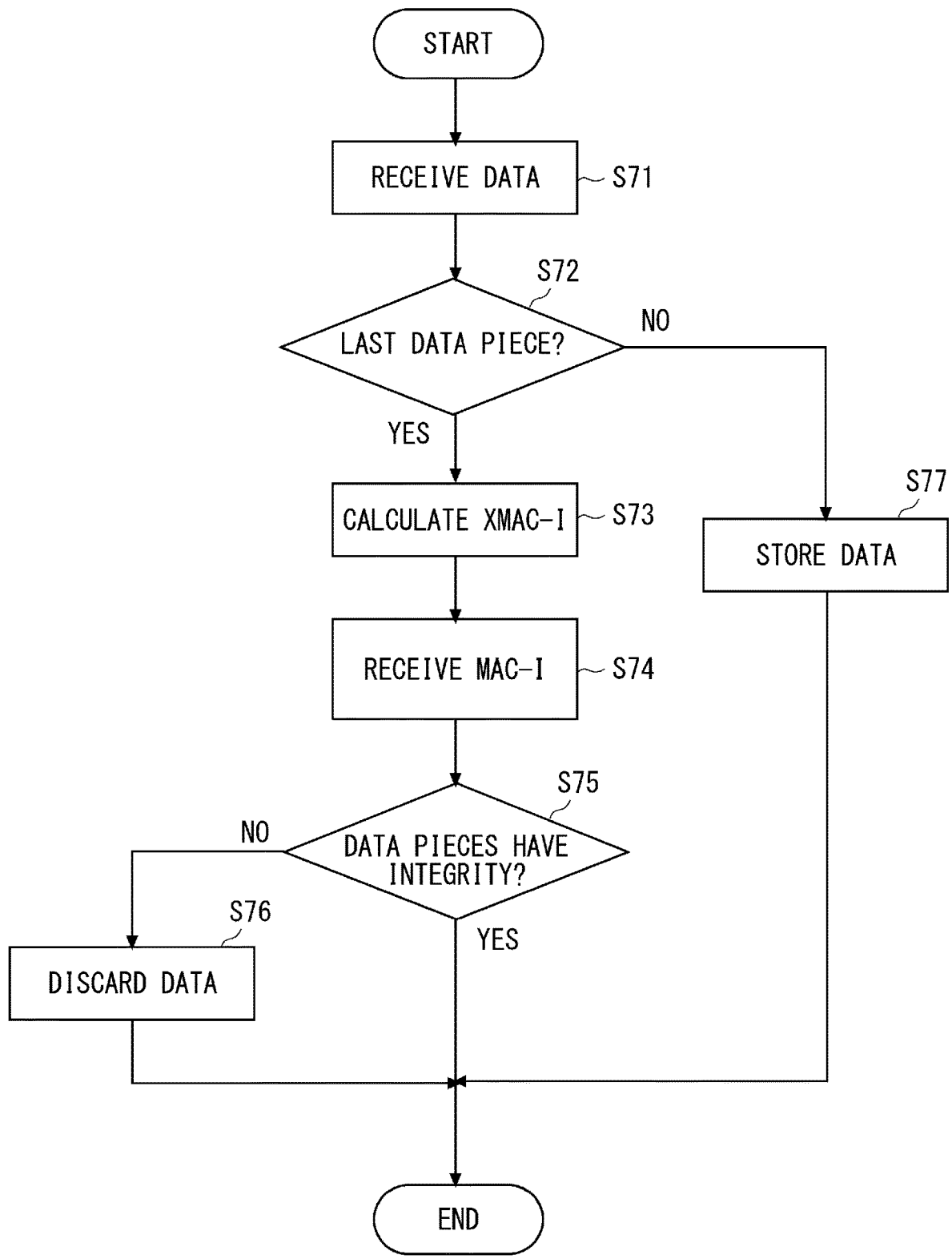
FIG. 14 is a diagram showing a flow of data reception processing according to the fifth example embodiment.

Next, a flow of data reception processing in the reception apparatus 20 according to the fifth example embodiment will be described with reference to FIG. 14. Steps S71 to S73 are the same as Steps S51 to S53 in FIG. 12, respectively, and therefore detailed description of Steps S71 to S73 is omitted.

In Step S74, the communication unit 23 receives the MAC-I from the transmission apparatus 10 (S74). That is, the communication unit 23 receives the MAC-I transmitted from the transmission apparatus 10 at a timing different from the timing when the first to Nth data pieces are transmitted. In FIG. 14, although it is described that the communication unit 23 receives the MAC-I after Step S73, the communication unit 23 may receive the MAC-I at any timing from Step S72 onward. Steps S75 to S77 are the same as Steps S55 to S57 in FIG. 12, respectively, and therefore detailed description of Steps S75 to S77 is omitted.

As described above, in the fifth example embodiment, the transmission apparatus 10 can transmit one MAC-I generated for a plurality of data pieces to the reception apparatus 20 at a timing different from the timing at which each data piece is transmitted. In this manner, in the fifth example embodiment, the same effects as that achieved by the second example embodiment can be achieved.

Next, an example of the configurations of the UE 15 and the core network apparatus 25, which can be either of the transmission apparatus 10 and the reception apparatus 20 described in the above example embodiments, will be described.

Figure 15:
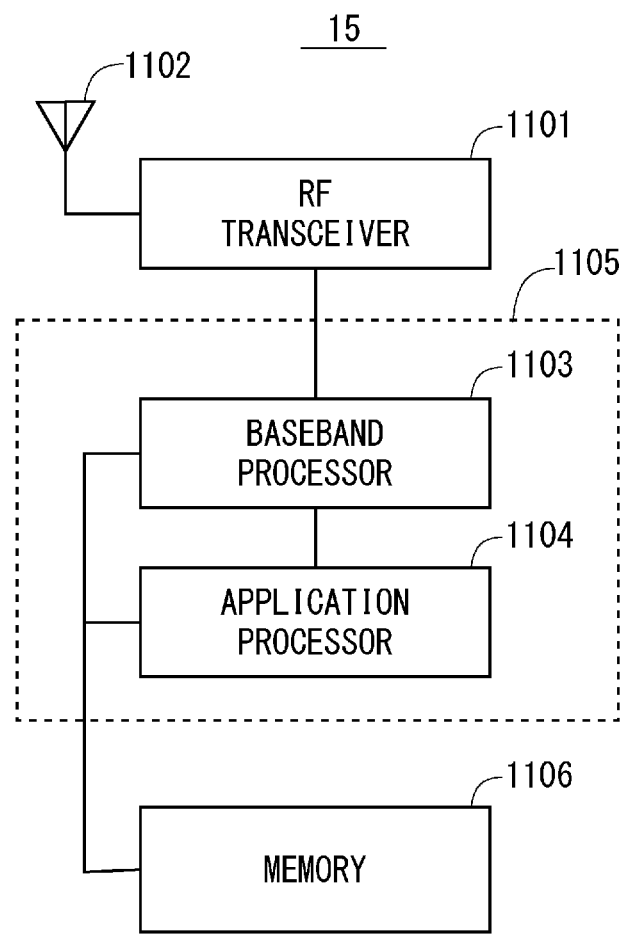
FIG. 15 is a configuration diagram of a UE according to each example embodiment.

FIG. 15 is a block diagram showing a configuration example of the UE 15. A radio frequency (RF) transceiver 1101 performs analog RF signal processing to communicate with the base station. The analog RF signal processing performed by the RF transceiver 1101 includes frequency upconversion, frequency downconversion, and amplification. The RF transceiver 1101 is coupled to an antenna 1102 and a baseband processor 1103. That is, the RF transceiver 1101 receives modulation symbol data (or OFDM symbol data) from the baseband processor 1103, generates a transmission RF signal, and supplies the transmission RF signal to the antenna 1102. The RF transceiver 1101 also generates a baseband reception signal based on the received reception RF signal received by the antenna 1102 and supplies the baseband reception signal to the baseband processor 1103.

The baseband processor 1103 performs digital baseband signal processing (data plane processing) and control plane processing for wireless communication. The digital baseband signal processing includes (a) data compression/decompression, (b) data segmentation/concatenation, and (c) transmission format (transmission frame) composition/decomposition. The digital baseband signal processing further includes (d) channel encoding/decoding, (e) modulation (i.e., symbol mapping)/demodulation, and (f) Inverse Fast Fourier Transform (IFFT) generation of OFDM symbol data (baseband OFDM signal). On the other hand, the control plane processing includes communication management of the layer 1 (e.g., transmission power control), the layer 2 (e.g., radio resource management, and hybrid automatic repeat request (HARQ) processing), and the layer 3 (e.g., signaling regarding attachment, mobility, and call management).

For example, in the case of LTE and 5G, the digital baseband signal processing by the baseband processor 1103 may include signal processing in the Packet Data Convergence Protocol (PDCP) layer, Radio Link Control (RLC) layer, MAC layer, and PHY layer. The control plane processing performed by the baseband processor 1103 may also include processing of Non-Access Stratum (NAS) protocol, RRC protocol, and MAC CE.

The baseband processor 1103 may include a modem processor (e.g., Digital Signal Processor (DSP)) which performs the digital baseband signal processing and a protocol stack processor (e.g., Central Processing Unit (CPU), or Micro Processing Unit (MPU)) which performs the control plane processing. In this case, the protocol stack processor which performs the control plane processing may be integrated with an application processor 1104 described later.

The application processor 1104 may also be referred to as a CPU, an MPU, a microprocessor, or a processor core. The application processor 1104 may include a plurality of processors (processor cores). The application processor 1104 provides various functions of the UE 15 by executing a system software program (Operating System (OS)) loaded from the memory 1106 or a memory not shown. Alternatively, the application processor 1104 provides various functions of the UE 15 by executing various application programs loaded from the memory 1106 or the memory not shown. The application programs are, for example, a voice call application, a WEB browser, a mailer, a camera operation application, and a music reproduction application.

In some implementations, as represented by the dashed line (1105) in FIG. 15, the baseband processor 1103 and the application processor 1104 may be integrated on a single chip. In other words, the baseband processor 1103 and the application processor 1104 may be implemented in a single System on Chip (SoC) device 1105. A SoC device may be referred to as a system Large Scale Integration (LSI) or a chipset.

The memory 1106 is a volatile memory or a non-volatile memory or a combination thereof. The memory 1106 may include a plurality of physically independent memory devices. The volatile memory is, for example, Static Random Access Memory (SRAM), Dynamic RAM (DRAM) or a combination thereof. The non-volatile memory may be Mask Read Only Memory (MROM), an Electrically Erasable Programmable ROM (EEPROM), a flash memory, a hard disk drive, or any combination thereof. The memory 1106 may include, for example, an external memory device that can be accessed from the baseband processor 1103, the application processor 1104, or the SoC 1105. The memory 1106 may include an internal memory device integrated within the baseband processor 1103, the application processor 1104, or the SoC 1105. Further, the memory 1106 may include a memory in a Universal Integrated Circuit Card (UICC).

The memory 1106 may store a software module(s) (computer programs) including instructions and data for processing by the UE 15 described in the above example embodiments. In some implementations, the baseband processor 1103 or the application processor 1104 may load the software modules from the memory 1106 and execute the loaded software modules, thereby performing the processing described in the above example embodiments.

Figure 16:
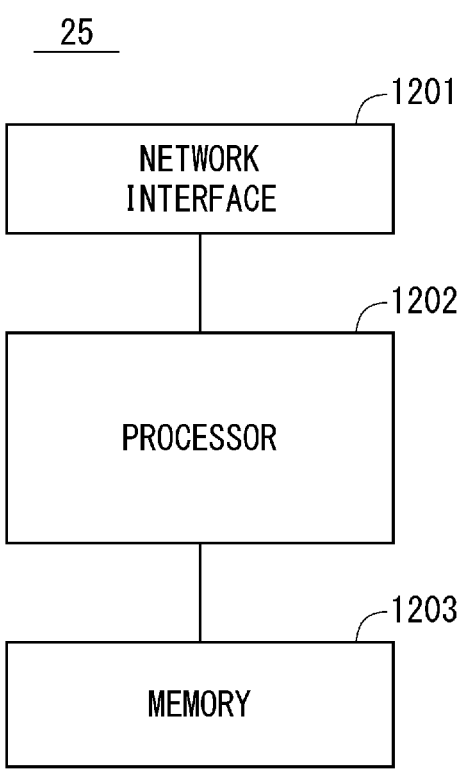
FIG. 16 is a configuration diagram of a core network apparatus according to each example embodiment.

FIG. 16 is a block diagram showing a configuration example of the core network apparatus 25. Referring to FIG. 16, the core network apparatus 25 includes a network interface 1201, a processor 1202, and a memory 1203. The network interface 1201 is used to communicate with other network node apparatuses constituting the communication system. The network interface 1201 may include, for example, an IEEE 802.3 series compliant network interface card (NIC).

The processor 1202 reads the software (computer program) from the memory 1203 and executes it to perform the processing of the core network apparatus 25 described with reference to the sequence diagrams and the flowcharts in the above-described example embodiments. The processor 1202 may be, for example, a microprocessor, an MPU (Micro Processing Unit), or a CPU (Central Processing Unit). The processor 1202 may include a plurality of processors.

The memory 1203 is composed of a combination of a volatile memory and a non-volatile memory. The memory 1203 may include a storage located separately from the processor 1202. In this case, the processor 1202 may access the memory 1203 via an I/O interface (not shown).

In the example of FIG. 16, the memory 1203 is used to store software modules. The processor 1202 reads these software modules from the memory 1203 and executes them, thereby performing the processing of the core network apparatus 25 described in the above example embodiments.

As described with reference to FIG. 16, each of the processors included in the core network apparatus 25 executes one or more programs including instructions for causing a computer to execute the algorithms described with reference to the drawings.

In the above example, the programs can be stored and provided to a computer using any type of non-transitory computer readable media. Non-transitory computer readable media include any type of tangible storage media. Examples of non-transitory computer readable media include magnetic storage media, optical magnetic storage media (e.g. magneto-optical disks), CD-ROM (Read Only Memory), CD-R, CD-R/W, and semiconductor memories. The magnetic storage media may be, for example, floppy disks, magnetic tapes, or hard disk drives. The semiconductor memories may be, for example, Mask ROM, Programmable ROM (PROM), Erasable PROM (EPROM), flash ROM, or Random Access Memory (RAM). These programs may be provided to a computer using any type of transitory computer readable media. Examples of transitory computer readable media include electric signals, optical signals, and electromagnetic waves. Transitory computer readable media can be used to provide programs to a computer via a wired communication line (e.g., electric wires, and optical fibers) or a wireless communication line.

In this specification, a User Equipment (UE) (or mobile station, mobile terminal, a mobile device, or a wireless terminal (wireless device)) is an entity connected to a network via a wireless interface.

The UE of the present disclosure is not limited to a dedicated communication device, and may be any of the following devices having a communication function as the UE of the present disclosure.

The terms "User Equipment (UE) as a word used by the 3GPP", "mobile station", "mobile terminal", "mobile device", and "wireless terminal" are intended to be generally synonymous with each other, and may be, for example, a stand-alone mobile station, such as a terminal, a mobile phone, a smartphone, a tablet, a cellular IoT terminal, or an IoT device.

It will be understood that the terms "UE" and "wireless terminal" also include devices that remain stationary for long periods of time.

Further, the UE may also be, for example, a production/manufacturing facility and/or an energy-related machine (such as a boiler, an engine, a turbine, a solar panel, an aerogenerator, a hydroelectric generator, a thermal power generator, a nuclear power generator, a storage battery, a nuclear power system, nuclear power-related equipment, heavy electrical equipment, a pump including a vacuum pump or the like, a compressor, a fan, a blower, hydraulic equipment, pneumatic equipment, a metal processing machine, a manipulator, a robot, a robotic application system, a tool, a mold, a roll, a conveyance apparatus, an elevator, a cargo handling apparatus, a textile machine, a sewing machine, a printing machine, a printing-related machine, a paper processing machine, a chemical machine, a mining machine, a mining-related machine, a construction machine, a construction-related machine, an agricultural machine and/or equipment, a forestry machine and/or equipment, a fishery machine and/or equipment, safety and/or environmental protection equipment, a tractor, a bearing, a precision bearing, a chain, a gear, a power transmission apparatus, a lubricating apparatus, a valve, a pipe joint, and/or application systems for any of above-described apparatuses or machines).

Further, the UE may be, for example, a transportation apparatus (such as a vehicle, an automobile, a motorcycle, a bicycle, a train, a bus, a bicycle trailer, a rickshaw, ships (ships and other watercrafts), an airplane, a rocket, a satellite, a drone, a balloon, etc.).

Further, the UE may be, for example, an item for an information communication apparatus (such as an electronic computer and a related apparatus, a communication apparatus and a related apparatus, an electronic component, etc.).

Further, the UE may be, for example, a refrigerator, a refrigerator application product and apparatus, commercial and service equipment, a vending machine, an automatic service machine, an office machine and apparatus, or a consumer electric/electronic appliance (such as audio equipment, a speaker, a radio, video equipment, a television, a microwave oven, a rice cooker, a coffee maker, a dishwasher, a washing machine, a dryer, an electric fan, a ventilation fan and a related product, a vacuum cleaner, etc.).

Further, the UE may be, for example, an electronic application system or an electronic application apparatus (such as an X-ray apparatus, a particle accelerator, a radioactive-substance application apparatus, an acoustic-wave application apparatus, an electromagnetic application apparatus, an electric-power application apparatus, etc.).

Further, the UE may be, for example, a light bulb, lighting, a weighing instrument, an analytical instrument, a testing machine and a measuring machine (such as a smoke alarm, an antipersonnel alarm sensor, a motion sensor, a radio tag, etc.), a clock (a watch or a clock), a physical and chemical machine, an optical machine, medical equipment and/or a medical system, a weapon, a cutlery and artisan's tool, or a hand tool.

Further, the UE may be, for example, a personal digital assistant or apparatus equipped with a wireless communication function (such as an electronic apparatus (e.g., a personal computer and an electronic measuring instrument) that is configured so that a wireless card, a wireless module, or the like is attached thereto or inserted thereinto).

Further, the UE may be, for example, an apparatus or a part of an apparatus that provides the below-described application, the service, or the solution in "Internet of all things (IoT: Internet of Things)" using a wired or wireless communication technology.

An IoT device (or an entity) includes appropriate electronic equipment, software, a sensor, a network connection, and the like that enable the device and other devices to collect data from each other and to exchange data with each other.

Further, the IoT device may also be automated equipment that operates according to a software command stored in an internal memory.

Further, the IoT device may also operate without requiring supervision or a response from a human being. Further, the IoT device may also be an apparatus that is fixedly installed over a long period of time and/or an apparatus that remains in an inactive state over a long period of time.

Further, the IoT device can also be implemented as a part of a stationary apparatus. The IoT device can be embedded in a non-stationary apparatus (e.g., a vehicle) or attached to an animal or a person to be monitored/tracked.

It will be understood that the IoT technology can be implemented in any type of a communication device that can be connected to a communication network through which data is transmitted/received irrespective of whether it is controlled by an input by a human being or a software instruction stored in a memory.

It will be understood that the IoT device is also called a machine-type communication (Machine Type Communication, MTC) device, a machine-to-machine (Machine to Machine, M2M) communication device or a NB-IoT (Narrow Band-IoT) UE.

Further, it will be understood that the UE can support one or a plurality of IoT or MTC applications.

Some examples of the MTC application are listed in the below-shown table (excerpts from: 3GPP TS22.368 V13.2.0 (2017-01-13) Annex B, the contents of which are incorporated in this specification by reference). This list is not exhaustive and represents some examples of the MTC application.

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |

-continued

| Service Area | MTC applications |
|---|---|
| | Pay as you drive (PAYD) |
| | Asset Tracking |
| | Navigation |
| | Traffic information |
| | Road tolling |
| | Road traffic optimization/steering |
| Payment | Point of sales (POS) |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ | Sensors |
| Control | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Examples of the application, the service, and the solution include an MVNO (Mobile Virtual Network Operator) service/system, a wireless disaster prevention service/system, a private wireless telephone (PBX (Private Branch eXchange) service/system, a PHS/digital cordless telephone service/system, a POS (Point of Sale) system, an advertisement transmission (or distribution) service/system, a multicast (MBMS (Multimedia Broadcast and Multicast Service)) service/system, a V2X (Vehicle to Everything: inter-vehicle communication and roadside-to-vehicle/pedestrian-to-vehicle communication) service/system, an in-train mobile wireless service/system, a positional information-related service/system, a disaster/emergency radio communication service/system, an IoT (Internet of Things) service/system, a community service/system, a video distribution service/system, a Femto-cell application service/system, a VoLTE (Voice over LTE) service/system, a radio TAG service/system, a billing service/system, a radio-on-demand service/system, a roaming service/system, a user behavior monitoring service/system, a communication carrier/communication NW selecting service/system, a function restriction service/system, a PoC (Proof of Concept) service/system, a personal information management service/system for a terminal, a display/video service/system for a terminal, a non-communication service/system for a terminal, an ad hoc NW/DTN (Delay Tolerant Networking) service/system, etc.

Note that the above-described category of UEs is merely an example of applications of the technical concept and example embodiments described in this specification. Needless to say, they are not limited to the aforementioned examples, and those skilled in the art can make various modifications thereto.

Note that the present disclosure is not limited to the above-described example embodiment, and may be modified as appropriate without departing from the spirit of the invention.

Although the present disclosure has been described above with reference to the example embodiments, the present disclosure is not limited by the above. Various modifications can be made to the configurations and details of the present disclosure that be understood by a person skilled in the art within the scope of the invention.

The present application is based upon and claims the benefit of priority from Japanese Patent Application No. 2018-172140, filed on Sep. 14, 2018, the entire contents of which are hereby incorporated by reference.

The whole or part of the above embodiments can be described as, but not limited to, the following supplementary notes.

(Supplementary Note 1)

A transmission apparatus comprising:

a generation unit configured to generate authentication information used for confirming integrity of a plurality of data pieces using the plurality of data pieces and an integrity protection key transmitted at different timings; and a communication unit configured to transmit the plurality of data pieces and the authentication information to a reception apparatus for confirming the integrity of the plurality of data pieces.

(Supplementary Note 2)

The transmission apparatus according to Supplementary note 1, wherein the communication unit sequentially transmits the plurality of data pieces, and transmits the authentication information together with any of the plurality of data pieces.

(Supplementary Note 3)

The transmission apparatus according to Supplementary note 2, wherein the communication unit transmits the authentication information together with a data piece to be transmitted last among the plurality of data pieces.

(Supplementary Note 4)

The transmission apparatus according to Supplementary note 1, wherein the communication unit sequentially transmits the plurality of data pieces, and transmits the authentication information at a timing different from the timing at which the plurality of data pieces are transmitted.

(Supplementary Note 5)

The transmission apparatus according to Supplementary note 1, wherein the generation unit divides the authentication information into two or more pieces, and the communication unit sequentially transmits the plurality of data pieces, and transmits the divided authentication information pieces together with two or more data pieces among the plurality of data pieces.

(Supplementary Note 6)

The transmission apparatus according to any one of Supplementary notes 1 to 5, wherein the generation unit uses a predetermined number of data pieces and the integrity protection key to generate the authentication information used for confirming the integrity of the predetermined number of data pieces.

(Supplementary Note 7)

The transmission apparatus according to any one of Supplementary notes 1 to 5, wherein the generation unit changes the number of data pieces used to generate the authentication information every time the authentication information is generated.

(Supplementary Note 8)

The transmission apparatus according to any one of Supplementary notes 1 to 7, wherein the communication unit sequentially transmits data to which presence information is added, the presence information indicating whether or not the authentication information is added (Supplementary Note 9)

A reception apparatus comprising:
a communication unit configured to receive a plurality of data pieces transmitted and first authentication information used for confirming integrity of the plurality of data pieces at different timings;
a generation unit configured to generate second authentication information using the plurality of data pieces and an integrity protection key; and
a determination unit configured to determine whether or not the first authentication information matches the second authentication information, and discard the plurality of data pieces when the first authentication information does not match the second authentication information.

(Supplementary Note 10)

The reception apparatus according to Supplementary note 9, wherein
the communication unit receives the plurality of data pieces sequentially transmitted, and receives the first authentication information transmitted together with any of the plurality of data pieces.

(Supplementary Note 11)

The reception apparatus according to Supplementary note 10, wherein
the communication unit receives the first authentication information transmitted together with the data piece transmitted last among the plurality of data pieces.

(Supplementary Note 12)

A communication system comprising:
a transmission apparatus comprising:
a generation unit configured to generate first authentication information used for confirming integrity of a plurality of data pieces using the plurality of data pieces and an integrity protection key transmitted at different timings; and
a communication unit configured to transmit the plurality of data pieces and the first authentication information; and
a reception apparatus comprising:
a communication unit configured to receive the plurality of data pieces and the first authentication information transmitted at different timings;
a generation unit configured to generate second authentication information using the plurality of data pieces and the integrity protection key; and
a determination unit configured to determine whether or not the first authentication information matches the second authentication information, and discard the plurality of data pieces when the first authentication information does not match the second authentication information.

(Supplementary Note 13)

The communication system according to Supplementary note 12, wherein
the transmission apparatus is configured to sequentially transmit the plurality of data pieces, and transmit the first authentication information together with any of the plurality of data pieces.

(Supplementary Note 14)

A communication method executed by a transmission apparatus, the communication method comprising:

generating authentication information used for confirming integrity of a plurality of data pieces using the plurality of data pieces and an integrity protection key transmitted at different timings; and
transmitting the plurality of data pieces and the authentication information to a reception apparatus for confirming the integrity of the plurality of data pieces.

(Supplementary Note 15)

A data processing method executed by a reception apparatus, the data processing method including:
receiving a plurality of data pieces and first authentication information used for confirming integrity of the plurality of data pieces transmitted at different timings;
generating second authentication information using the plurality of data pieces and an integrity protection key; and
determining whether or not the first authentication information matches the second authentication information, and discarding the plurality of data pieces when the first authentication information does not match the second authentication information.

REFERENCE SIGNS LIST

10 TRANSMISSION APPARATUS
11 GENERATION UNIT
12 COMMUNICATION UNIT
15 UE
20 RECEPTION APPARATUS
21 DETERMINATION UNIT
22 GENERATION UNIT
23 COMMUNICATION UNIT
25 CORE NETWORK APPARATUS

What is claimed is:

1. A User Equipment (UE) comprising:
one or more memories storing instructions; and
one or more processors configured to execute the instructions to:
generate a Packet Data Convergence Protocol (PDCP) data comprising a header, user plane data, and a Message Authentication Code for Integrity (MAC-I), wherein the header includes a first field indicating whether or not the data needs integrity protection and a second field indicating whether the PDCP data is first data including the MAC-I or second data not including the MAC-I, and
transmit, to an apparatus, an integrity protected PDCP data.

2. The UE according to claim 1, wherein
the apparatus discards the integrity protected PDCP data when an integrity check using the MAC-I fails.

3. The UE according to claim 2, wherein the integrity check is performed by comparing the MAC-I and a received MAC-I.

4. A communication method executed by a User Equipment (UE), the method comprising:
generating a Packet Data Convergence Protocol (PDCP) data comprising a header, user plane data, and a Message Authentication Code for Integrity (MAC-I), wherein the header includes a first field indicating whether or not the data needs integrity protection and a second field indicating whether the PDCP data is first data including the MAC-I or second data not including the MAC-I; and
transmitting, to an apparatus, an integrity protected PDCP data.

5. The communication method according to claim 4, further comprising discarding, by the apparatus, the integrity protected PDCP data when an integrity check using the MAC-I fails.

6. The communication method according to claim 5, wherein the integrity check is performed by comparing the MAC-I and a received MAC-I.

7. A communication method executed by an apparatus, the method comprising:
- generating a Packet Data Convergence Protocol (PDCP) data comprising a header, user plane data, and a Message Authentication Code for Integrity (MAC-I), wherein the header includes a first field indicating whether or not the data needs integrity protection and a second field indicating whether the PDCP data is first data including the MAC-I or second data not including the MAC-I; and
- transmitting, to a User Equipment (UE), an integrity protected PDCP data.

8. The communication method according to claim 7, further comprising discarding, by the UE, the integrity protected PDCP data when an integrity check using the MAC-I fails.

9. An apparatus comprising:

one or more memories storing instructions; and one or more processors configured to execute the instructions to:
- generate a Packet Data Convergence Protocol (PDCP) data comprising a header, user plane data, and a Message Authentication Code for Integrity (MAC-I), wherein the header includes a first field indicating whether or not the data needs integrity protection and a second field indicating whether the PDCP data is first data including the MAC-I or second data not including the MAC-I, and
- transmit, to a User Equipment (UE), an integrity protected PDCP data.

10. The apparatus according to claim 9, wherein the UE discards the integrity protected PDCP data when an integrity check using the MAC-I fails.

* * * * *